Patented Sept. 13, 1949

2,481,981

UNITED STATES PATENT OFFICE 2,481,981

STABLE HIGH REACTIVITY PARAFORMALDEHYDE

Robert Lee Craven, Westfield, N. J., assignor to E. I. du Pont de Nemours & Company, Wilmington, Del., a corporation of Delaware No Drawing. Application June 23, 1948, Serial No. 34,831

5 Claims. (Cl. 260—340)

This invention relates to paraformaldehyde compositions and method for producing the same. More particularly, it relates to paraformaldehyde having a high degree of reactivity and having an improved stability against loss of reactivity on storage.

Paraformaldehyde is a mixture of polyoxymethylene glycols, $HO \cdot (CH_2O)_n \cdot H$, containing from 93% to 99% available formaldehyde, $CH_2O$, and in which the polyoxymethylene glycol molecules may contain from 8 to 100 formaldehyde units.

When first prepared, a polymer of this type has a low average molecular weight, but on standing polymerization takes place and the molecular weight increases. This change is indicated by a decrease in solubility and chemical activity as well as an increase in melting point. In 1932, Staudinger ("Die Hochmolekularen Organisch Verbindungen," pages 251–254, Berlin, Julius Springer) reported that a crude mixture of polyoxymethylene glycols obtained by cooling hot 80% formaldehyde contained a considerable quantity of low molecular weight polymer which was soluble in hot acetone. On standing in a desiccator, a polymer prepared in this manner decreased in solubility until it became completely insoluble in hot acetone. According to Staudinger's solubility measurements, this would indicate the disappearance of polymer molecules containing twelve or less formaldehyde units.

Commercial paraformaldehyde, as well as paraformaldehyde prepared in the laboratory by commonly employed methods, decreases in reactivity and solubility in water and other solvents, and increases in melting point and in average molecular weight, on storage. In the copending application of J. Frederic Walker, Serial No. 613,453, filed August 29, 1945, now Patent No. 2,456,161, issued December 14, 1948, a process has been disclosed whereby the reactivity of paraformaldehyde is stabilized by the addition of pentaerythritol thereto.

It is an object of this invention to provide a new method for the production of paraformaldehyde having a high reactivity and an improved stability against loss of reactivity on storage.

It is another object of this invention to provide a new and improved paraformaldehyde composition.

It is a still further object of this invention to provide a paraformaldehyde composition having a high stability against increase in average molecular weight.

Other objects of this invention will appear hereinafter.

The objects of this invention may be accomplished, in general, by dissolving a small quantity of a substance taken from the group consisting of hydantoin, monomethyl hydantoin, dimethyl hydantoin, and N-methylol derivatives of hydantoin, monomethyl hydantoin, and dimethyl hydantoin, in an aqueous solution of formaldehyde, and converting the aqueous formaldehyde to paraformaldehyde by the removal of the water from the solution. The removal of water from the aqueous formaldehyde may be accomplished by any known method, for example, by vacuum distillation, evaporation at reduced pressure, or the like. The water may, for example, be removed by the addition to the formaldehyde solution of a non-miscible liquid such as benzene or ethyl acetate, followed by distillation of a low-boiling azeotrope formed by the non-miscible liquid and the water. Preferably, the water is removed by vacuum distillation or evaporation at a pressure not to exceed 150 mm. Hg.

The product of this invention is a modified paraformaldehyde containing 0.1% to 10% of N-methylol hydantoin, N-methylol monomethyl hydantoin, or N-methylol dimethyl hydantoin. Preferably, the modified paraformaldehyde contains 0.5% to 2.5% of N-methylol hydantoin or methyl derivative of the N-methylol hydantoin. If the stabilizing agent is added in the form of hydantoin, monomethyl hydantoin, or dimethyl hydantoin it will be converted, respectively, to the methylol derivatives in the presence of formaldehyde, and will probably appear in the final product loosely combined as a polyoxymethylene hemiacetal, $RCH_2OCH_2O(CH_2O)_nCH_2OH$, in which R signifies the hydantoin radical.

The preparation of the modified paraformaldehyde is carried out by dissolving the above-mentioned hydantoin or derivatives of hydantoin in an aqueous formaldehyde solution containing preferably 30% to 50% dissolved formaldehyde in such proportion that there is not less than one-half pound nor more than eighty pounds of the above-mentioned hydantoin or hydantoin derivatives per one thousand pounds of formaldehyde in the formaldehyde solution. The resultant solution is then converted to modified paraformaldehyde by distillation or evaporation of water, preferably by vacuum distillation or evaporation.

The following examples illustrate preferred detailed processes for practicing the invention, it being understood that the scope of the invention is not limited to the specified details set forth therein.

Example I

Dimethyl hydantoin in the amount of 18.7 parts was dissolved in 8638 parts of a 45% formaldehyde solution. This solution was then placed in a stainless-steel reactor and subjected to vacuum distillation at a pressure of approximately 135 mm. Hg. Distillation was continued until approximately 1900 parts of solid paraformaldehyde was left in the reactor. This material was then ground to a fine powder. Analyses indicated that the polymer contained approximately 95% combined formaldehyde, melted in the temperature range of 120° C. to 132° C., and had a resorcinol reactivity of 4.1 minutes. After six months' storage at room temperature, its reactivity was 6.3 minutes. A similar product prepared from formaldehyde solution to which no dimethyl hydantoin had been added was found to contain 93.9% by weight combined formaldehyde, melted in the range of 129° C. to 134° C. and had a reactivity of 4.9 minutes. However, after six months' storage, the latter had a reactivity of 11 minutes. These results indicate that the paraformaldehyde modified with the dimethyl hydantoin shows little tendency to decrease in reactivity on storage.

Reactivity measurements were made on the above paraformaldehyde by determining its reactivity with resorcinol in accordance with the following test: Place 15 ml. of normal sodium hydroxide into a beaker. Then add 15 grams resorcinol (U. S. P. recrystallized or reagent grade) to the sodium hydroxide solution, dissolve, and let stand for one hour at room temperature. (Approximately 21° C.) Place 25 ml. of the resorcinol solution in a test tube and adjust the temperature thereof to 25° C. Add five grams of the paraformaldehyde to be tested and agitate sufficiently to disperse the same throughout the solution. Place the test tube in a Dewar flask and agitate the same with stirring by hand or a mechanical apparatus. The stirring should be at a sufficient rate to keep the paraformaldehyde suspended in the solution. Then record the time required for the temperature of the reaction to reach 60° C. beginning from the time that the paraformaldehyde was added to the resorcinol solution. This time in minutes will give a fairly accurate test of the reactivity of the paraformaldehyde.

The following table indicates the difference between the paraformaldehyde modified with dimethyl hydantoin and the control containing no hydantoin.

|  | Resorcinol Activity Value in Minutes | | |
| --- | --- | --- | --- |
|  | After 0 Days | After 60 Days | After 17 Months |
| Dimethyl Hydantoin Modified Paraformaldehyde | Minutes 4.4 | Minutes 6.2 | Minutes 6.3 |
| Unmodified Paraformaldehyde | 4.0 | 6.7 | 15.1 |

The water-solubility rate of the above-described hydantoin modified paraformaldehyde was also studied by measuring its rate of solution in water adjusted to a pH of 4. In this procedure, five grams of the paraformaldehyde were agitated with 25 cc. of a buffer solution consisting of a mixture of N/10 solutions of sodium formate and formic acid adjusted to a pH of 4. Agitation was continued for two hours at 35° C. by rotating samples in sealed one inch by six inch test tubes at four revolutions per minute in a constant temperature bath. The mixture in the test tubes was then filtered and the filtrate analyzed by the standard sodium sulfide procedure. The paraformaldehyde modified with hydantoin was found to dissolve to the extent of 11.4% when freshly prepared and still dissolved to the extent of 6.1% after 30 days. The unmodified, freshly prepared control sample dissolved to the extent of 7.2% and was 2.3% soluble after 30 days' storage.

Example II

A charge of 3660 pounds of approximately 45% formaldehyde, to which was added 8.2 pounds of dimethyl hydantoin, was vacuum distilled at a pressure of 100 mm. to 140 mm. Hg. In this way, approximately 1000 pounds of modified paraformaldehyde containing 95.0% formaldehyde were obtained. This material contained approximately 0.8% N-methylol dimethyl hydantoin and melted at a temperature of 122° C. to 128° C. The melting range of unmodified paraformaldehyde prepared in this same way normally falls between 122° C. and 134° C. The solubility of the dimethyl hydantoin modified paraformaldehyde in water buffered to a pH of 4.0, as described in Example I, was 11.4%. After four weeks' storage, the solubility was still 6.1%. An unmodified batch of paraformaldehyde was found to have a solubility of 9.8% as freshly prepared, and this value fell to 2.2% after four weeks' storage.

Example III

Paraformaldehyde was modified by the addition thereto of 1% by weight of N-methylol monomethyl hydantoin. The resulting paraformaldehyde had a melting temperature and a water solubility approximately of the same range as the dimethyl hydantoin modified paraformaldehyde of Examples I, and II, respectively.

In the preparation of adhesives and other resinous products, paraformaldehyde is often used as a hardening agent. This is particularly true when used in protein-containing adhesives or in resorcinol formaldehyde resins. In such cases, the reactivity of the polymer is important. In some cases, a highly reactive paraformaldehyde is desired, whereas, in other cases, the product of low reactivity is more suitable. Where a paraformaldehyde of high reactivity is desired, it is particularly desirable to have a paraformaldehyde which shows a low degree of reactivity loss upon aging.

Throughout the specification and claims, any reference to parts, proportions, and percentages refers to parts, proportions, and percentages by weight unless otherwise specified.

Since it is obvious that many changes and modifications can be made in the above-described details without departing from the nature and spirit of the invention, it is to be understood that the invention is not to be limited to said details except as set forth in the appended claims.

What is claimed is:

1. Paraformaldehyde containing, as an agent for controlling and stabilizing polymer reactivity, 0.1% to 10% of a substance taken from the group consisting of hydantoin, monomethyl hydantoin, dimethyl hydantoin, and N-methylol derivatives of hydantoin, monomethyl hydantoin, and dimethyl hydantoin.

2. Paraformaldehyde containing, as an agent for controlling and stabilizing polymer reactivity, 0.5% to 2.5% of a substance taken from the group consisting of hydantoin, monomethyl hydantoin, dimethyl hydantoin, and N-methylol derivatives of hydantoin, monomethyl hydantoin, and dimethyl hydantoin.

3. The process of producing a modified paraformaldehyde having a high stability against increase in molecular weight which comprises adding a substance taken from the group consisting of hydantoin, monomethyl hydantoin, dimethyl hydantoin, and N-methylol derivatives of hydantoin, monomethyl hydantoin, and dimethyl hydantoin in an amount equivalent to 0.05% to 8.0% of the dissolved formaldehyde to an aqueous solution of formaldehyde and heating said solution under vacuum to remove water therefrom until said paraformaldehyde is formed.

4. The process of producing a modified paraformaldehyde having a high stability against increase in molecular weight which comprises adding a substance taken from the group consisting of hydantoin, monomethyl hydantoin, dimethyl hydantoin, and N-methylol derivatives of hydantoin, monomethyl hydantoin, and dimethyl hydantoin in an amount equivalent to 0.05% to 8.0% of the dissolved formaldehyde to a 30% to 50% aqueous solution of formaldehyde and heating said solution under vacuum to remove water therefrom until said paraformaldehyde is formed.

5. The process of producing a modified paraformaldehyde having a high stability against increase in molecular weight which comprises adding a substance taken from the group consisting of hydantoin, monomethyl hydantoin, dimethyl hydantoin, and N-methylol derivatives of hydantoin, monomethyl hydantoin, and dimethyl hydantoin in an amount equivalent to 0.05% to 8.0% of the dissolved formaldehyde to an aqueous solution of formaldehyde and heating said solution under a pressure not to exceed 150 mm. Hg to remove water therefrom until said paraformaldehyde is formed.

ROBERT LEE CRAVEN.

REFERENCES CITED

The following references are of record in the file of this patent:

UNITED STATES PATENTS

| Number | Name | Date |
|---|---|---|
| 2,155,803 | Jacobson | Apr. 25, 1939 |